US006967061B1

(12) United States Patent
Munteanu et al.

(10) Patent No.: US 6,967,061 B1
(45) Date of Patent: Nov. 22, 2005

(54) BILAYER MAGNETIC STRUCTURE FOR HIGH DENSITY RECORDING MEDIA

(75) Inventors: Mariana Munteanu, Santa Clara, CA (US); Kuo-Hsing Hwang, San Jose, CA (US)

(73) Assignee: Seagate Technology LLC, Scotts Valley, CA (US)

(*) Notice: Subject to any disclaimer, the term of this patent is extended or adjusted under 35 U.S.C. 154(b) by 710 days.

(21) Appl. No.: 09/702,667

(22) Filed: Nov. 1, 2000

Related U.S. Application Data

(60) Provisional application No. 60/163,371, filed on Nov. 3, 1999.

(51) Int. Cl.$^7$ .................................... G11B 5/66
(52) U.S. Cl. ............... 428/611; 428/637; 428/668; 428/678; 428/694 TS; 428/694 TM
(58) Field of Search ............ 428/694 TM, 611, 428/637, 668, 678, 694 TS

(56) References Cited

U.S. PATENT DOCUMENTS

| | | | |
|---|---|---|---|
| 5,098,773 A | | 3/1992 | Saito et al. |
| 5,143,798 A | | 9/1992 | Fujii |
| 5,147,732 A | * | 9/1992 | Shiroishi et al. ............ 428/668 |
| 5,180,640 A | * | 1/1993 | Yamashita et al. .......... 428/611 |
| 5,432,012 A | | 7/1995 | Lal et al. |
| 5,558,945 A | | 9/1996 | Miyazaki et al. |
| 5,736,262 A | * | 4/1998 | Ohkijima et al. ............ 428/212 |
| 5,763,071 A | | 6/1998 | Chen et al. |
| 5,772,857 A | | 6/1998 | Zhang |
| 5,900,324 A | * | 5/1999 | Moroishi et al. ...... 204/192.15 |
| 5,952,097 A | | 9/1999 | Zhang |
| 6,129,981 A | * | 10/2000 | Okuyama et al. ............ 428/332 |
| 6,143,388 A | * | 11/2000 | Bian et al. .................. 360/128 |
| 6,156,404 A | * | 12/2000 | Ross et al. ................ 204/192.2 |
| 6,274,233 B1 | * | 8/2001 | Yoshikawa et al. .......... 428/332 |
| 6,303,217 B1 | * | 10/2001 | Malhotra et al. ........... 428/332 |

OTHER PUBLICATIONS

Song, L., Gardner, R., McLaurin, S., and Sedighi, M., IEEE Trans. Mag., 30(6), 1994, 4011-4013.*
CoCrTa/CoCrPtTa Double-Layer Films for Magnetic Recording, Bing Zhang et al. IEEE Transactions on Magnetics, vol. 32, No. 5, Sep. 1996, pp. 3590-3592.
Low-Noise Media Using Double-Layer CoNiCr thin films for longitudinal recording, H. Hata, et al., J. Appl. Phys., vol. 67, No. 9, May 1990, pp. 4692-4694.
Crystallography of Co/Cr Bilayer Magnetic Thin Films, K. Hono et al., J. Appl. Phys. vol. 68, No. 9, Nov. 1990, pp. 4734-4740.
Crystallography and Magnetic Properties of CoCrTa Films Prepared on Cr Underlayers With Different Substrate Bias Conditions, Jason Presessky, et al., J. Appl. Phys., vol. 69, No. 8, Apr. 1991, pp. 5163-5165.

* cited by examiner

*Primary Examiner*—Kevin M. Bernatz
(74) *Attorney, Agent, or Firm*—McDermott Will & Emery LLP

(57) ABSTRACT

High density longitudinal magnetic recording media are formed with two magnetic layers for enhanced SMNR, high signal, low PW 50 and high resolution. The bilayer magnetic structure comprises a first magnetic layer optimized for SMNR and a second magnetic layer formed directly on the first magnetic layer and optimized for Ms. Embodiments of the present invention include first and second magnetic layers containing Co, Cr and Pt, wherein the first magnetic layer has a higher Cr content than the second magnetic layer and the second magnetic layer has a higher Co content than the first magnetic layer.

5 Claims, 1 Drawing Sheet

BILAYER MAGNETIC STRUCTURE FOR HIGH DENSITY RECORDING MEDIA

RELATED APPLICATIONS

This application claims priority from Provisional Application Ser. No. 60/163,371 filed on Nov. 3, 1999 entitled: "BILAYER MAG STRUCTURE FOR HIGH DENSITY RECORDING MEDIA" the entire disclosure of which is hereby incorporated by reference herein.

TECHNICAL FIELD

The present invention relates to magnetic recording media, such as thin film magnetic recording disks. The present invention has particular applicability to high areal density longitudinal magnetic recording media exhibiting low noise and enhanced magnetic performance.

BACKGROUND ART

Magnetic recording media are extensively employed in the computer industry and can be locally magnetized by a write transducer or write head to record and store information. The write transducer creates a highly concentrated magnetic field which alternates direction based upon bits of the information being stored. When the local magnetic field produced by the write transducer is greater than the coercivity of the recording medium, grains of the recording medium at that location are magnetized. The grains retain their magnetization after the magnetic field produced by the write transducer is removed. The direction of the magnetization matches the direction of the applied magnetic field. The magnetization of the recording medium can subsequently produce an electrical response to a read sensor, allowing the stored information to be read.

There is an ever increasing demand for magnetic recording media with higher storage capacity and lower noise. Efforts, therefore, have been made to reduce the space required to magnetically record bits of information while maintaining the integrity of the information. The space necessary to record information in magnetic recording media depends upon the size of transitions between oppositely magnetized areas. It is, therefore, desirable to produce magnetic recording media that will support the smallest transition size possible. However, the signal output from the transition must avoid excessive noise to reliably maintain the integrity of the stored information. Media noise is generally characterized as the sharpness of a signal on readback against the sharpness of a signal on writing and is generally expressed as signal-to-media noise ratio (SMNR).

The increasing demands for higher areal recording density impose increasingly greater demands on thin film magnetic recording media in terms of coercivity (Hc), magnetic saturation (Ms), magnetic remanance (Mr), coercivity squareness (S*), SMNR, and narrow track recording performance. It is extremely difficult to produce a magnetic recording medium satisfying such demanding requirements.

The linear recording density can be increased by increasing the Hc of the magnetic recording medium, and can be accomplished by decreasing the medium noise, as by maintaining very fine magnetically non-coupled grains. Medium noise in thin films is a dominant factor restricting increased recording density of high density magnetic hard disk drives, and is attributed primarily to inhomogeneous and large grain size and intergranular exchange coupling. Accordingly, in order to increase linear density, medium noise must be minimized by suitable microstructure control.

Longitudinal magnetic recording media containing cobalt (Co) or Co-based alloy magnetic films with a chromium (Cr) or Cr alloy underlayer deposited on a non-magnetic substrate have become the industry standard. For thin film longitudinal magnetic recording media, the desired crystallized structure of the Co and Co alloys is hexagonal close packed (HCP) with uniaxial crystalline anisotropy and a magnetization easy direction along the c-axis is in the plane of the film. The better the in-plane c-axis crystallographic texture, the more suitable is the Co alloy thin film for use in longitudinal recording to achieve high remanance. For very small grain sizes coercivity increases with increased grain size. The large grains, however, result in greater noise. Accordingly, there is a need to achieve high coercivities without the increase in noise associated with large grains. In order to achieve low noise magnetic recording media, the Co alloy thin film should have uniform small grains with grain boundaries capable of magnetically isolating neighboring grains. This type of microstructural and crystallographic control is typically attempted by manipulating the deposition process, grooving the substrate surface and proper use of an underlayer.

Underlayers can strongly influence the crystallographic orientation, the grain size and chemical segregation of the Co alloy grain boundaries. Conventional underlayers include Cr and alloys of Cr with elements such as titanium (Ti), tungsten (W), molybdenum (Mo) and vanadium (V).

There are other basic characteristics of magnetic recording media, aside from SMNR, which are indicative of recording performance, such as half-amplitude pulse width (PW50), overwrite (OW), and modulation level. At high linear recording density, adjacent bits are crowded together. A wide PW50 results in interference which limits the linear packing density of bits in an even track and, hence, reduces packing density in a given area thereby eliminating the recording capacity of the magnetic recording medium. Accordingly, a narrow PW50 is desirable for high areal recording density.

OW is a measure of the ability of a magnetic recording medium to accommodate overwriting of existing data. In other words, OW is a measure of what remains of a first signal after a second signal, e.g., at a different frequency, has been written over it on the medium. OW is considered low or poor when a significant amount of the first signal remains.

It is extremely difficult to obtain optimum performance from a magnetic recording medium by optimizing each of the PW50, OW, SMNR and modulation level, as these performance criteria are interrelated and tend to be offsetting. For example, if coercivity is increased to obtain a narrower PW50, OW is typically adversely impacted, as increasing coercivity typically degrades OW. A thinner medium having a lower Mr x thickness (Mrt) yields a narrower PW50 and better OW; however, the medium signal is typically reduced. Increasing the squareness of the hysteresis loop contributes to a narrower PW50 and better OW; however, noise may increase due to intergranular exchange coupling and magnetostatic interaction. Thus, a formidable challenge is presented to optimize magnetic performance in terms of PW50, OW, SMNR and modulation level.

As the drive to higher and higher recording density increases, attempts have been made to achieve high coercivities by increasing the amount of platinum (Pt) in the Co-based magnetic alloys. In order to improve SMNR, the chromium (Cr) content is simultaneously increased. However, as a result of increasing both the Pt and Cr contents, the cobalt (Co) content is decreased thereby detrimentally impacting Ms, triggering lower amplitudes and weaker signals. In order to compensate for the diminished signal, the magnetic film can be made thicker. However, as the thickness of the magnetic film increases, the PW50 becomes wider and the resolution decreases.

Chen et al. in U.S. Pat. No. 5,763,071 disclose a magnetic recording medium containing a magnetically isotropic layer formed directly on a magnetically anisotropic layer. Zhang in U.S. Pat. Nos. 5,952,097 and 5,772,857 disclose magnetic recording media containing bi-layer magnetic films comprising a lower magnetic layer of a low noise magnetic material and an upper magnetic layer of a high coercivity magnetic material, such as a CoCrTa lower layer and a CoCrTaPt upper layer. Miyazaki et al. in U.S. Pat. No. 5,558,945 disclose a magnetic recording medium containing at least two ferromagnetic thin films, wherein the uppermost film has a higher saturation magnetization and a higher coercive force than the lower film.

There exists a continuing need for high areal density longitudinal magnetic recording media exhibiting high coercivity, high SMNR, high signal, low PW50 and high resolution.

DISCLOSURE OF THE INVENTION

An advantage of the present invention is a magnetic recording medium for high areal recording density exhibiting low noise, high coercivity, high signal, low PW50 and high resolution.

Additional advantages and features of the present invention will be set forth in part in the description which follows and in part will become apparent to those having ordinary skill in the art upon examination of the following only to be learned from the practice of the present invention. The advantages of the present invention may be realized and obtained and particularly pointed out in the appended claims.

According to the present invention, the foregoing and other advantages are achieved in part by a magnetic recording medium comprising: a non-magnetic substrate; an underlayer on the non-magnetic substrate; a first magnetic layer on the underlayer; and a second magnetic layer on the first magnetic layer; wherein: the first magnetic layer exhibits a higher signal to media noise ratio (SMNR) than the second magnetic layer; and the second magnetic layer exhibits a higher magnetic saturation (Ms) than the first magnetic layer.

Embodiments of the present invention comprise magnetic recording media containing first and second magnetic layers each containing Co, Cr, and Pt, wherein the first magnetic layer has a higher Cr content than the second magnetic layer and the second magnetic layer has a higher Co content than the first magnetic layer. Embodiments of the present invention further comprise composite underlayer structures comprising a first Cr alloy layer and a second Cr alloy layer, different from the first Cr alloy, on the first Cr alloy layer. Advantageously, the bi-layer magnetic structure of the present invention provides means which enable the achievement of high SMNR, narrow PW50, high resolution and high Ms.

Additional advantages of the present invention will become readily apparent to those skilled in this art from the following detailed description, wherein only the preferred embodiment of the present invention is shown and described, simply by way of illustration of the best mode contemplated for carrying out the present invention. As will be realized, the present invention is capable of other and different embodiments, and its details are capable of modifications in various obvious respects, all without departing from the present invention. Accordingly, the drawings and description are to be regarded as illustrative in nature and not as restrictive.

DESCRIPTION OF THE INVENTION

Figure 1:
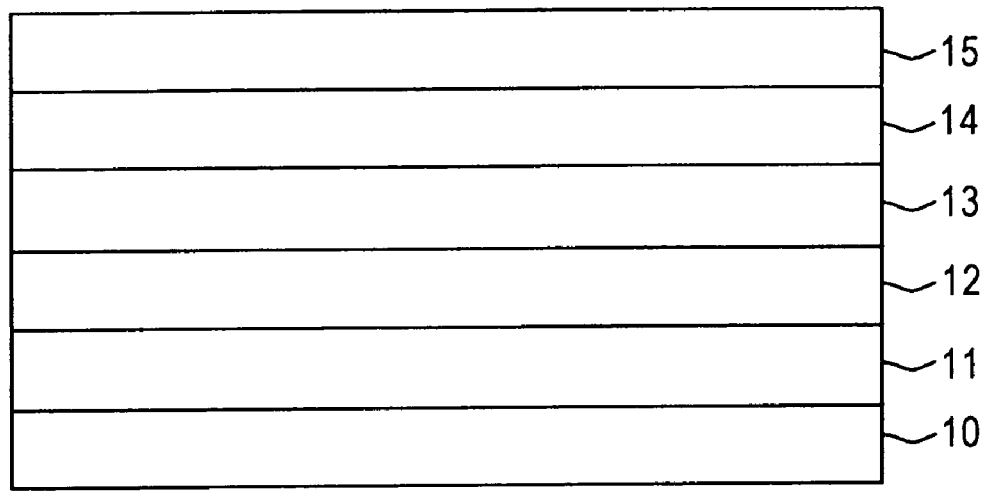
FIG. 1 schematically illustrates a magnetic recording medium in accordance with an embodiment of the present invention.

The present invention provides high areal recording density longitudinal magnetic recording media exhibiting high SMNR, high coercivity, high Ms, high resolution and narrow PW50. The present invention achieves such technological advantages by providing a strategic combination of first and second magnetic layers, wherein the first magnetic layer is optimized for SMNR and the second magnetic layer, which is provided on the first magnetic layer, is optimized for Ms.

In conducting experimental testing it was found that if the Pt content of a Co-based magnetic alloy layer is increased for higher coercivity and the Cr content increased for improved SMNR, the Ms of the alloy is reduced, thereby triggering lower amplitudes and weaker signals. If the thickness of the magnetic film is increased to compensate for diminished signal, the PW50 becomes wider and the resolution is lowered. The parametric results of such experimental testing is reported in Table I below.

TABLE I

Table 1: Parametric comparison results for high SMNR magnetic alloy.

| Disk ID | HC (Oe) | Mrt (memu/cm2) | S* | MFA (mV) | LFA (mV) | RES (%) | PW50 (nsec) | OW (-dB) | SMNR (db) |
|---|---|---|---|---|---|---|---|---|---|
| CoCrPtTa | 3234 | 0.628 | 0.803 | 0.910 | 1.271 | 71.5 | 13.56 | 32.8 | 20.1 |
| CoCr(+2%)Pt(+2%)Ta | 3350 | 0.631 | 0.787 | 0.858 | 1.304 | 65.8 | 13.96 | 32.2 | 20.7 |

In Table I above, "MFA" denotes medium frequency amplitude, "LFA" denotes low frequency amplitude and :"RES" denotes resolution which is the ratio of MFA/LFA. As apparent from Table I, by increasing Pt and Cr atomic percentages by 2%, each of the MFA and RES is lowered, PW50 becomes wider and SMNR improves.

On the other hand, high areal recording density demands a narrow PW50 and high RES for the magnetic film. These benefits can be derived by utilizing magnetic alloys having a high Ms. Such magnetic alloys having a high Ms typically have a low Cr content and a high Pt content and are able to achieve high coercivities and high Mrt, a very good signal and narrow PW50, but poor SMNR. This is illustrated in Table II below.

TABLE II

Table II: Parametric comparison result for high Ms magnetic alloys.

| Disk # (s/n) | Hc-(Oe) | Mrt (memu/cm2) | S* | MFA (mV) | LFA (mV) | RES (%) | PW50 (nsec) | OW (-dB) | SMNR (db) |
|---|---|---|---|---|---|---|---|---|---|
| CoCrPtTa | 3121 | 0.691 | 0.820 | 0.848 | 1.114 | 76.1 | 11.1 | 32.2 | 20.4 |
| CoCr(-1%)Pt(+3%)Ta | 3507 | 0.726 | 0.849 | 0.977 | 1.170 | 83.5 | 10.9 | 30.3 | 19.7 |

As apparent from Table II above, by decreasing the Cr content by 1 at. % and increasing the Pt by 3 at. %, coercivity increases by 400 Oe. However, for comparable Mrt values, the MFA is higher thereby driving the RES higher and the PW50 lower. Obviously, these alloys have a significant drawback for high density longitudinal recording medium stemming from poor SMNR performance.

The present invention is based upon the strategic combination of plural magnetic layers, each optimized to achieve a particular objective, thereby achieving overall high quality magnetic performance. In accordance with the present invention, a first magnetic layer, optimized for SMNR performance, is provided on an underlayer. A second magnetic layer, optimized for Ms, is provided on the first magnetic layer.

Embodiments of the present invention comprise first and second magnetic layers, each containing Co, Cr and Pt. Typically, the first magnetic layer contains a higher Cr content than the second magnetic layer; whereas the second magnetic layer contains a higher Co content than the first magnetic layer. The first magnetic layer is, therefore, chosen for optimum SMNR performance while the second magnetic layer is chosen for high Ms performance. In this way, a composite magnetic layer structure is provided which exhibits narrow PW50 and high resolution without sacrificing SMNR.

Given the guidance of the present disclosure, suitable magnetic alloys can be determined for the first and second magnetic layers in achieving the objectives of the present invention. For example, a suitable bi-layer structure comprises first and second magnetic layers based upon Co. In one example, the first magnetic layer can contain about 20 to about 22 at. % Cr, about 8 to about 10 at. % Pt, and about 6 to about 8 at. % B; and the second magnetic layer can contain about 12 to about 16 at. % Cr, about 6 to about 12 at. % Pt, e.g., about 4 at. % tantalum (Ta). In another example, the first Co-based magnetic layer can contain about 20 to about 22 at. % Cr, about 8 to about 10 at. % Pt, and about 6 to about 8 at. % B; and the second magnetic layer can contain about 12 to about 16 at. % Cr, about 6 to about 12 at. % Pt and about 6 to about 8 at. % B. The strategic combination of first and second magnetic layers formed in accordance with embodiments of the present invention provides magnetic recording media exhibiting a pronounced enhancement of SMNR with a significant decrease in PW50 for higher signals.

Substrates for use in the present invention include any of those conventionally employed in the manufacture of magnetic recording media, including aluminum (Al) or Al alloys having a nickel-phosphorous (NiP) plating thereon, or any of various alternative substrates, such as glass, glass-ceramic or ceramic substrates. Embodiments of the present invention further include a underlayer, such as Cr or a Cr alloy underlayer. Particularly advantageous results have been achieved with a composite underlayer structure comprising a first Cr alloy layer and second Cr alloy layer, wherein the Cr alloy of the second layer is different from that of the first layer. For example, suitable Cr alloys contain Cr and an alloying element such as Ti, W, Mo and V. Suitable combinations includes a first underlayer formed on the non-magnetic substrate comprising a Cr—W alloy and second underlayer comprising Cr on the first underlayer. The underlayers can be formed at a suitable thickness, such as a composite thickness of about 100 Å to about 200 Å.

Suitable magnetic layers for use in the present invention include Co—Cr—Pt, Co—Cr—Ta, Co—Cr—Pt—Ta and Co—Cr—Pt—Ta—Nb alloys. The magnetic layer structure of the present invention can comprise suitable combinations of any of various conventional magnetic alloys employed in magnetic recording medium wherein the first magnetic layer is optimized for SMNR performance and the second magnetic layer is optimized for Ms performance. Each magnetic layer can be deposited at a suitable thickness, for example, at a thickness of about 40 Å to about 150 Å for a total composite thickness of about 150 Å to about 200 Å.

An embodiment of the present invention is schematically illustrated in FIG. 1 and comprises substrate 10, e.g., an NiP plated Al, a first underlayer 11, e.g., Cr, a second underlayer 12 comprising a Cr—W alloy, a first magnetic layer 13 optimized for SMNR, a second magnetic layer 14 optimized for high Ms performance, and a carbon-containing protective overcoat 15. A conventional lubricant topcoat (not shown) is typically provided on protective overcoat 15. It should be understood that the layers 11 through 15 are sequentially deposited on both sides of substrate 10. Advantageously, magnetic recording media in accordance with the present invention can be manufactured using an in-line, pass-by sputtering system wherein the underlayers, magnetic layers and protective overcoat are sequentially sputter deposited on the substrate.

In carrying out embodiments of the present invention, the ratio of the first and second magnetic layers can be optimized to obtain maximum SMNR and a desired PW50. For example, the thickness of the first magnetic layer can be varied between about 100 Å to about 130 Å; while the second magnetic layer can be varied between about 40 Å to about 100 Å. In addition, the bias voltage applied in each of the magnetic stations can be optimized to enhance coercivity and S*. For example, the bias voltage employed in depositing the first magnetic layer can be varied between about 300 volts and about 500 volts, while the bias voltage employed in depositing the second magnetic layer can be varied between about 100 volts and about 300 volts.

Experimental testing confirmed the superior performance achieved by a magnetic bi-layer structure in accordance with the present invention vis-à-vis a single magnetic layer having a high SMNR. The results are set forth in Table III below.

TABLE III

Table III: Parametrics for the magnetic bilayer vs single magnetic layer having a high SMNR.

| Disk | Hc (Oe) | Mrt (memu/cm2) | S* | MFA (mV) | LFA (mV) | RES (%) | PW50 (nsec) | OW (−dB) | SMNR (db) |
|---|---|---|---|---|---|---|---|---|---|
| Single high SMNR layer | 3828 | 0.49 | 0.83 | 1.275 | 1.663 | 76.65 | 8.70 | 41.42 | 19.93 |
| Bilayer Mag: High SMNR/High Ms | 4107 | 0.50 | 0.86 | 1.433 | 1.779 | 80.53 | 8.44 | 39.41 | 20.53 |

As apparent from Table III, the present invention provides magnetic recording media exhibiting a significant enhancement in SMNR with a significant decrease in PW50 for higher signals.

The present invention enjoys industrial applicability in manufacturing high areal density longitudinal recording medium exhibiting low noise and enhanced magnetic properties. The magnetic recording media of the present invention are not limited to any particular substrate material, underlayer structure, magnetic layers or protective overcoats. The strategic use of first and second magnetic layers optimized for SMNR and Ms, respectively, enables the production of high areal density longitudinal magnetic recording medium exhibiting low noise and enhanced magnetic properties.

Only certain embodiments of the present invention and but a few examples of its versatility are shown and described in the present disclosure. It is to be understood that the present invention is capable of use in various other combinations and in environments, and is capable of changes and modifications within the scope of the inventive concept as expressed herein.

What is claimed is:

1. A magnetic recording medium comprising:
   a non-magnetic substrate;
   an underlayer on the non-magnetic substrate;
   a first magnetic layer on the underlayer; and
   a second magnetic layer on the first magnetic layer; wherein:
   the first magnetic layer exhibits a higher signal-to-media-noise ratio (SMNR) than the second magnetic layer;
   the second magnetic layer exhibits a higher magnetic saturation (Ms) than the first magnetic layer:
   the first and second magnetic layers each contains cobalt (Co), chromium (Cr) and platinum (Pt);
   the first magnetic layer has a higher Cr content than the second magnetic layer; and
   the second magnetic layer has a higher Co content than the first magnetic layer.

2. The magnetic recording medium according to claim 1, wherein:
   the first magnetic layer contains:
      about 20 to about 22 at. % Cr;
      about 8 to about 10 at. % Pt;
      about 6 to about 8 at. % boron (B); and
      the remainder Co; and
   the second magnetic layer contains
      about 12 to about 16 at. % Cr;
      about 6 to about 12 at. % Pt;
      about 2 to about 4 at. % tantalum (Ta); and
      the remainder Co.

3. The magnetic recording medium according to claim 1, wherein:
   the first magnetic layer contains:
      about 20 to about 22 at. % Cr;
      about 8 to about 10 at. % Pt;
      about 6 to about 8 at. % B; and
      the remainder Co; and
   the second magnetic layer contains:
      about 12 to about 16 at. % Cr;
      about 6 to about 12 at. % Pt;
      about 6 to about 8 at. % B; and
      the remainder Co.

4. The magnetic recording medium according to claim 1, wherein the underlayer is a composite comprising two underlayers each containing chromium (Cr).

5. The magnetic recording medium according to claim 4, comprising:
   a first underlayer comprising a Cr alloy on the non-magnetic substrate; and
   a second underlayer comprising a Cr alloy different from the Cr alloy of the first underlayer, on the first underlayer.

* * * * *